Jan. 4, 1966
G. T. GORE ETAL
3,227,119
MECHANISM FOR AUTOMATICALLY PRODUCING PILLOW
CASES, BAGS, AND THE LIKE
Filed Oct. 30, 1964
10 Sheets-Sheet 1
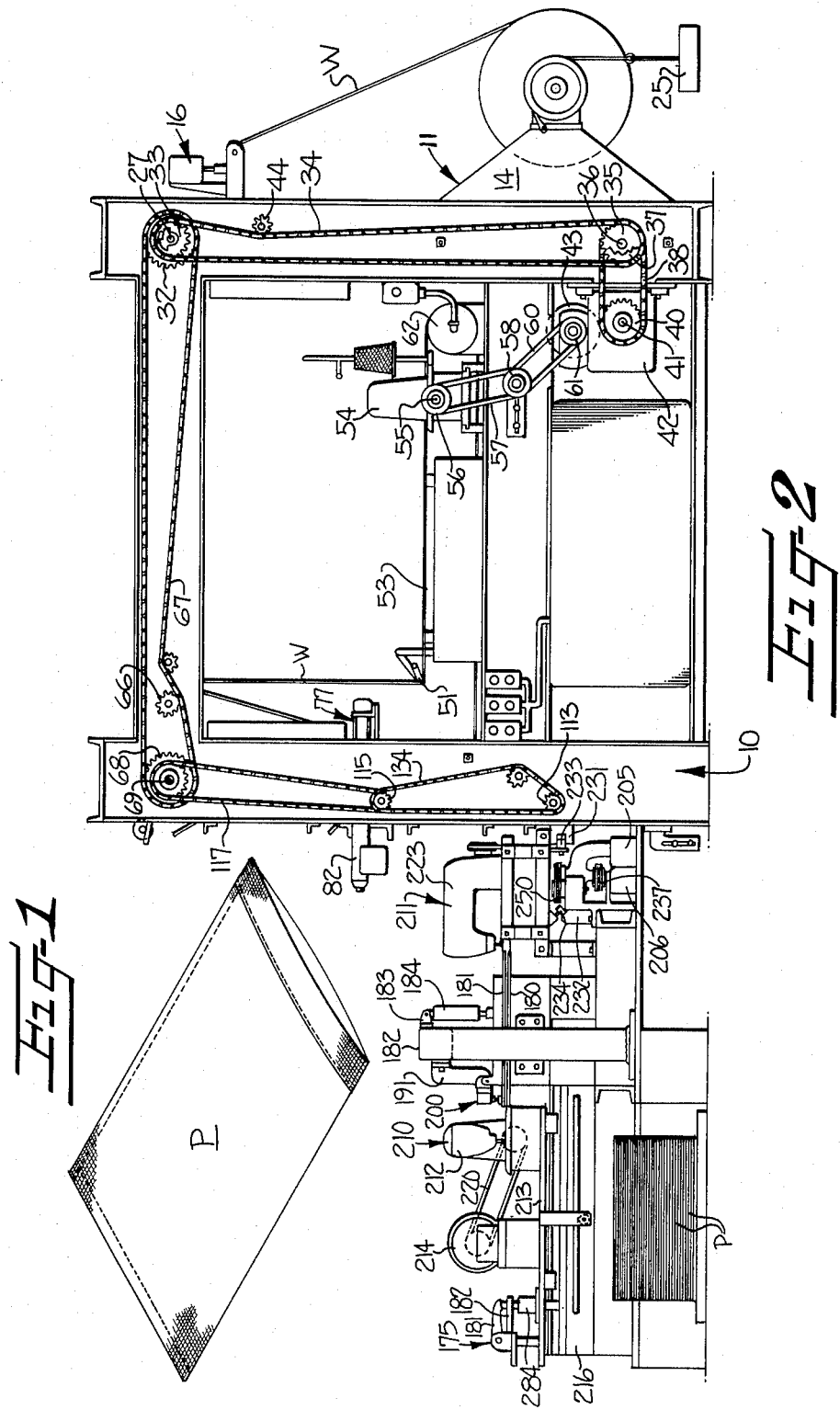

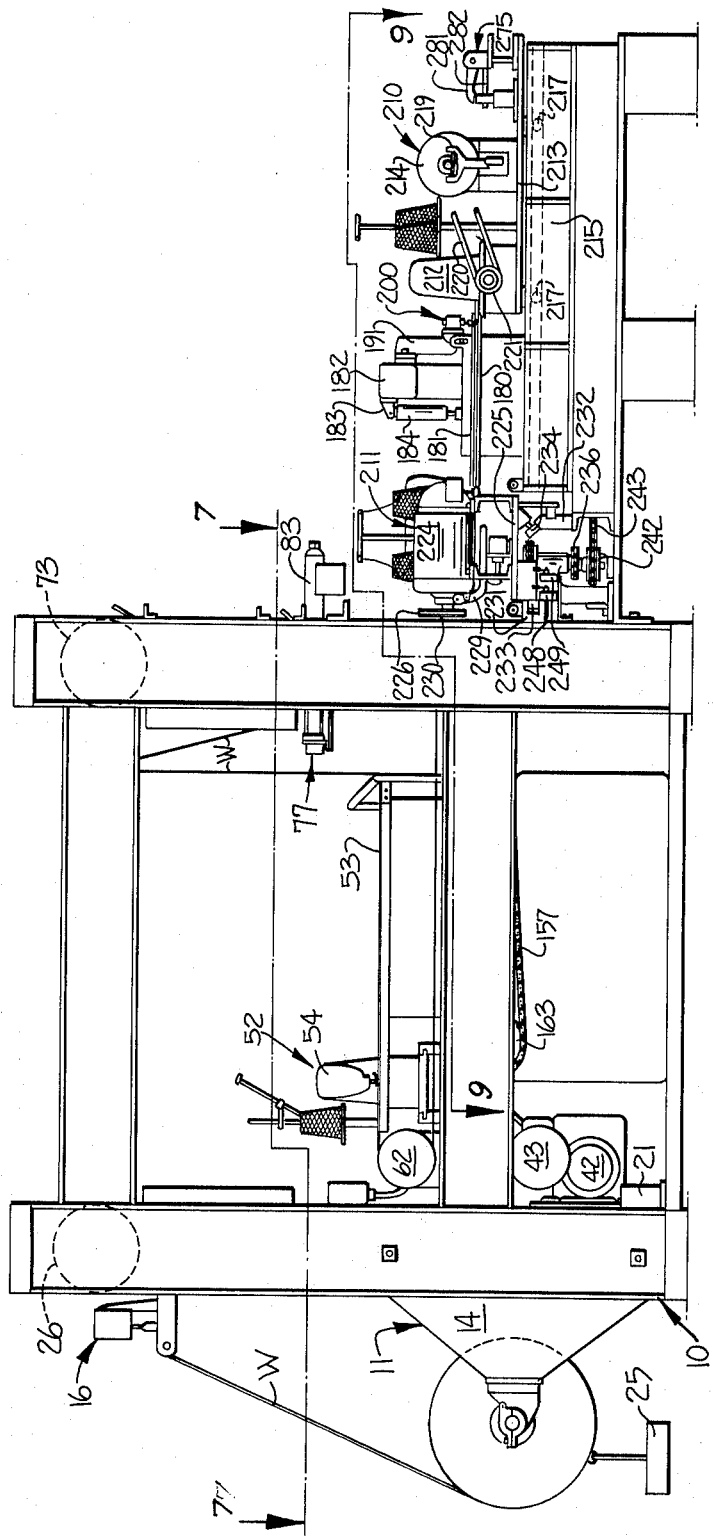

Jan. 4, 1966 G. T. GORE ETAL 3,227,119
MECHANISM FOR AUTOMATICALLY PRODUCING PILLOW
CASES, BAGS, AND THE LIKE
Filed Oct. 30, 1964 10 Sheets-Sheet 3
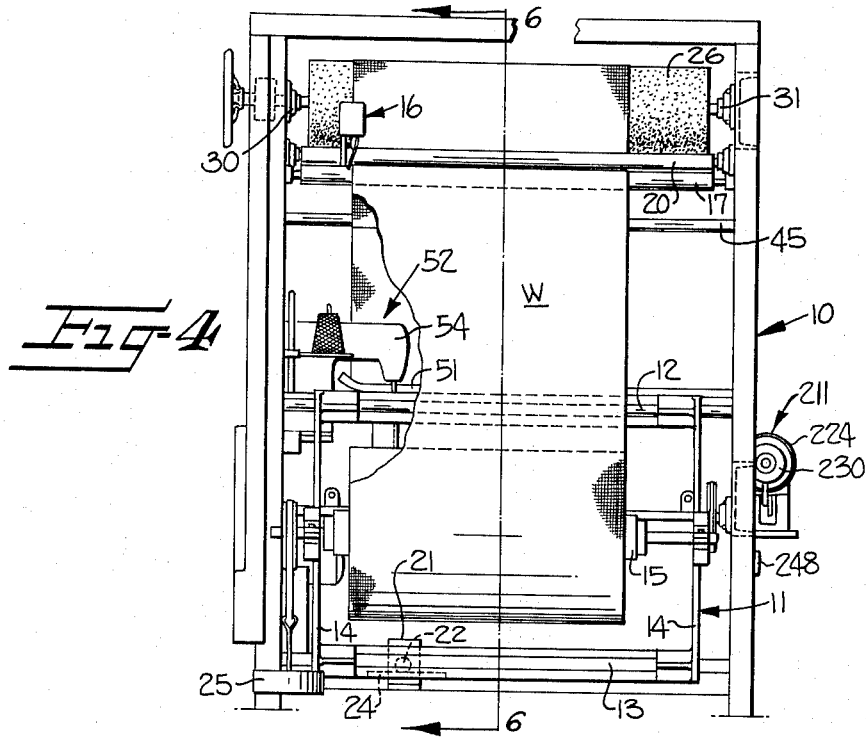
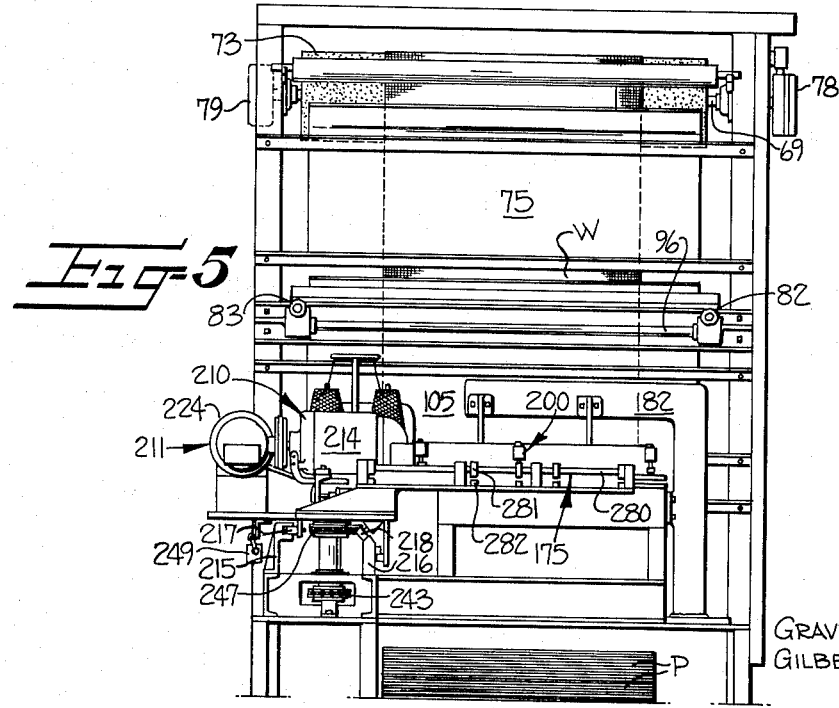
INVENTORS:
GRAVES T. GORE and
GILBERT F. NORCROSS
BY *Parrott, Bell, Seltzer, Park & Heard*
ATTORNEYS

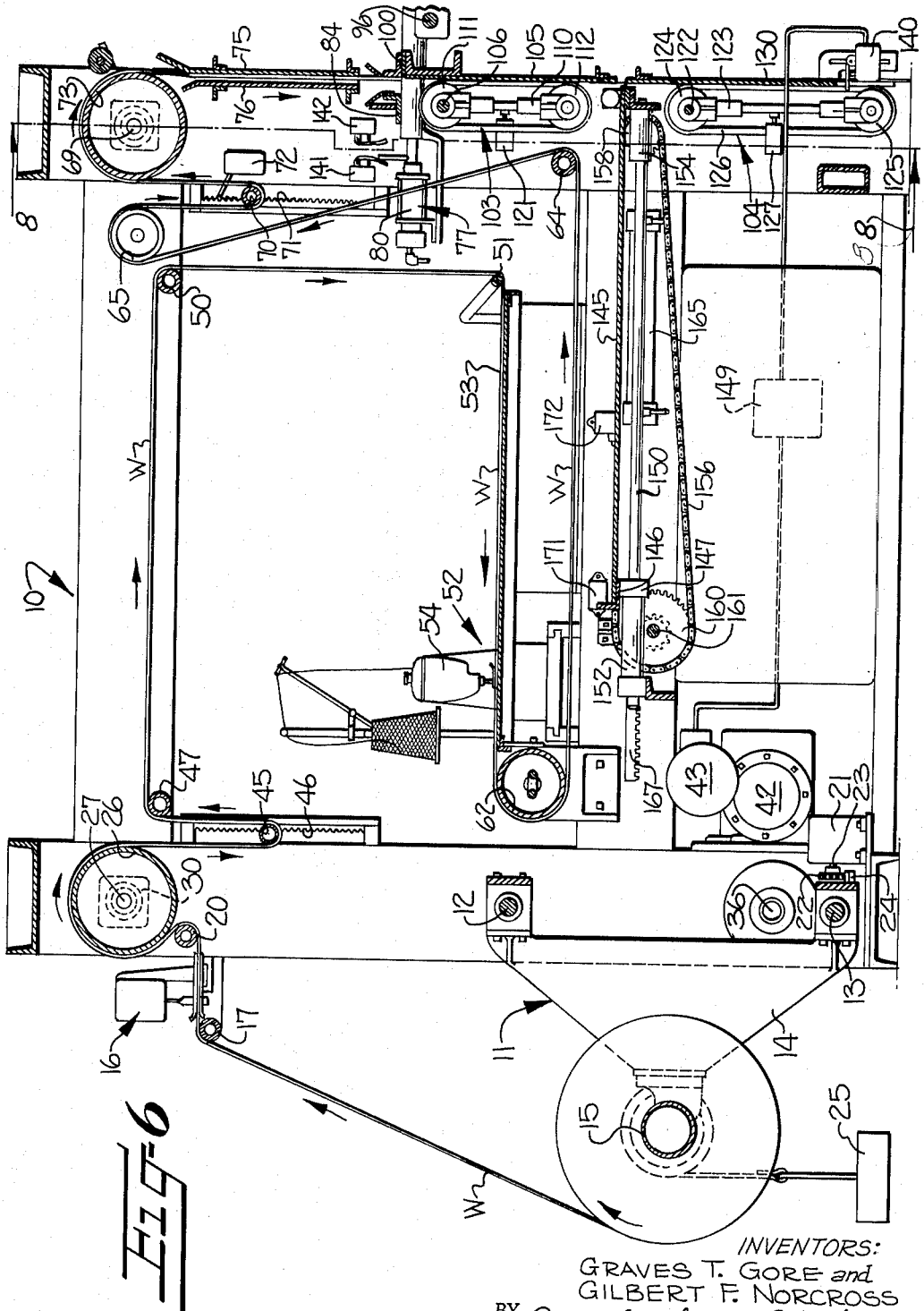

Jan. 4, 1966  G. T. GORE ETAL  3,227,119
MECHANISM FOR AUTOMATICALLY PRODUCING PILLOW
CASES, BAGS, AND THE LIKE
Filed Oct. 30, 1964  10 Sheets-Sheet 5

INVENTORS:
GRAVES T. GORE and
GILBERT F. NORCROSS

BY Parrott, Bell, Seltzer, Park & Heard
ATTORNEYS

INVENTORS:
GRAVES T. GORE and
GILBERT F. NORCROSS

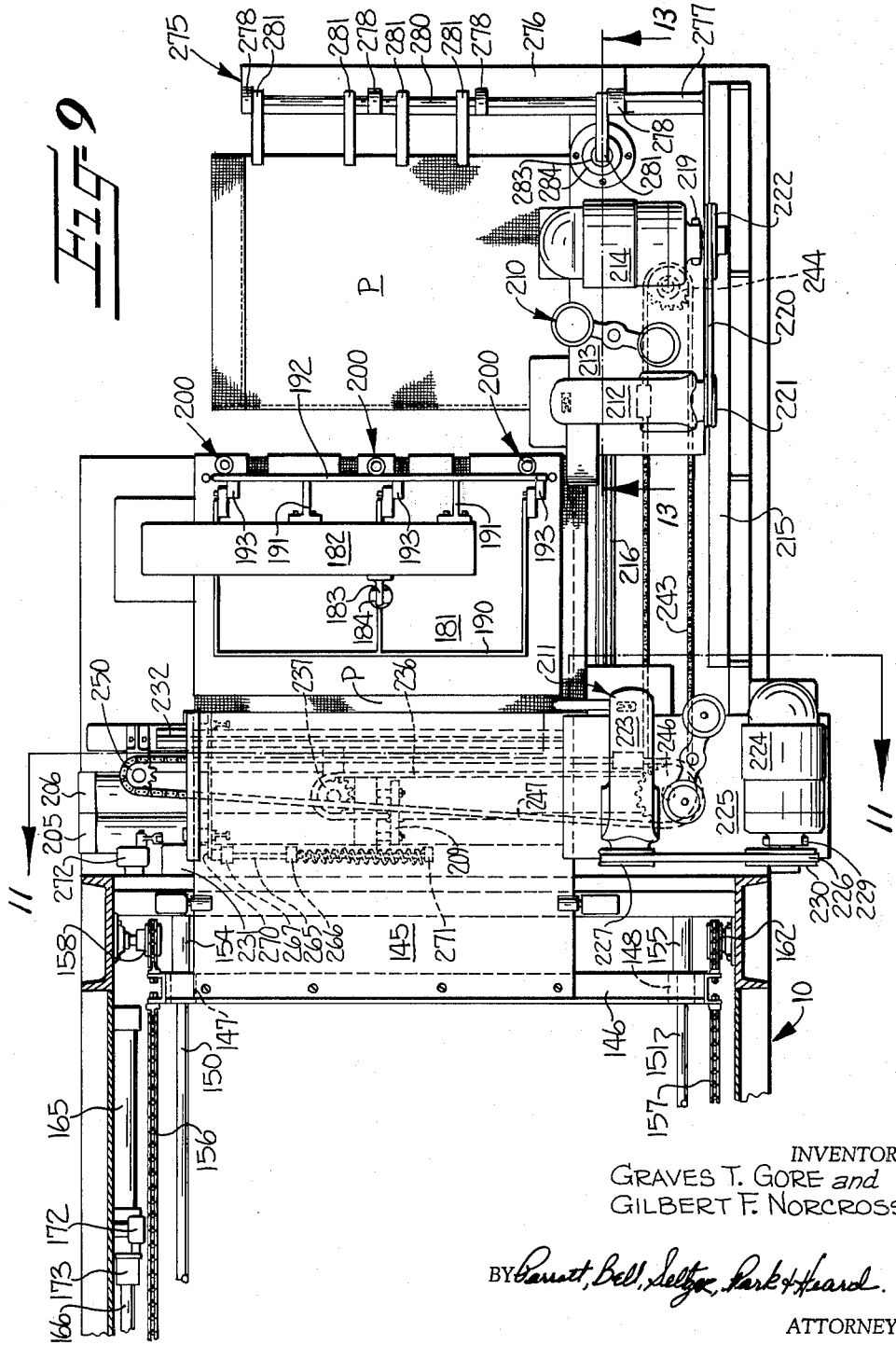

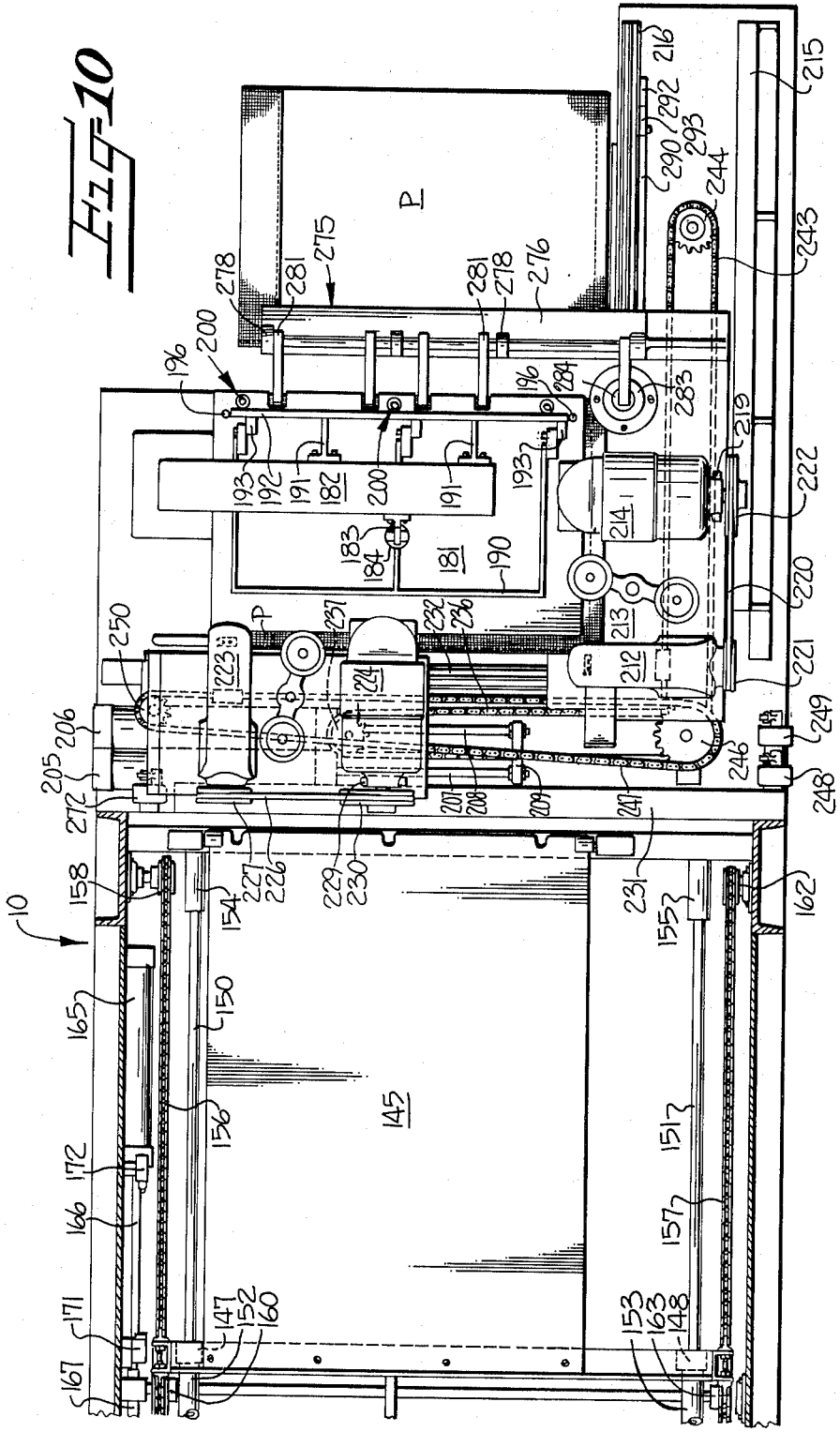

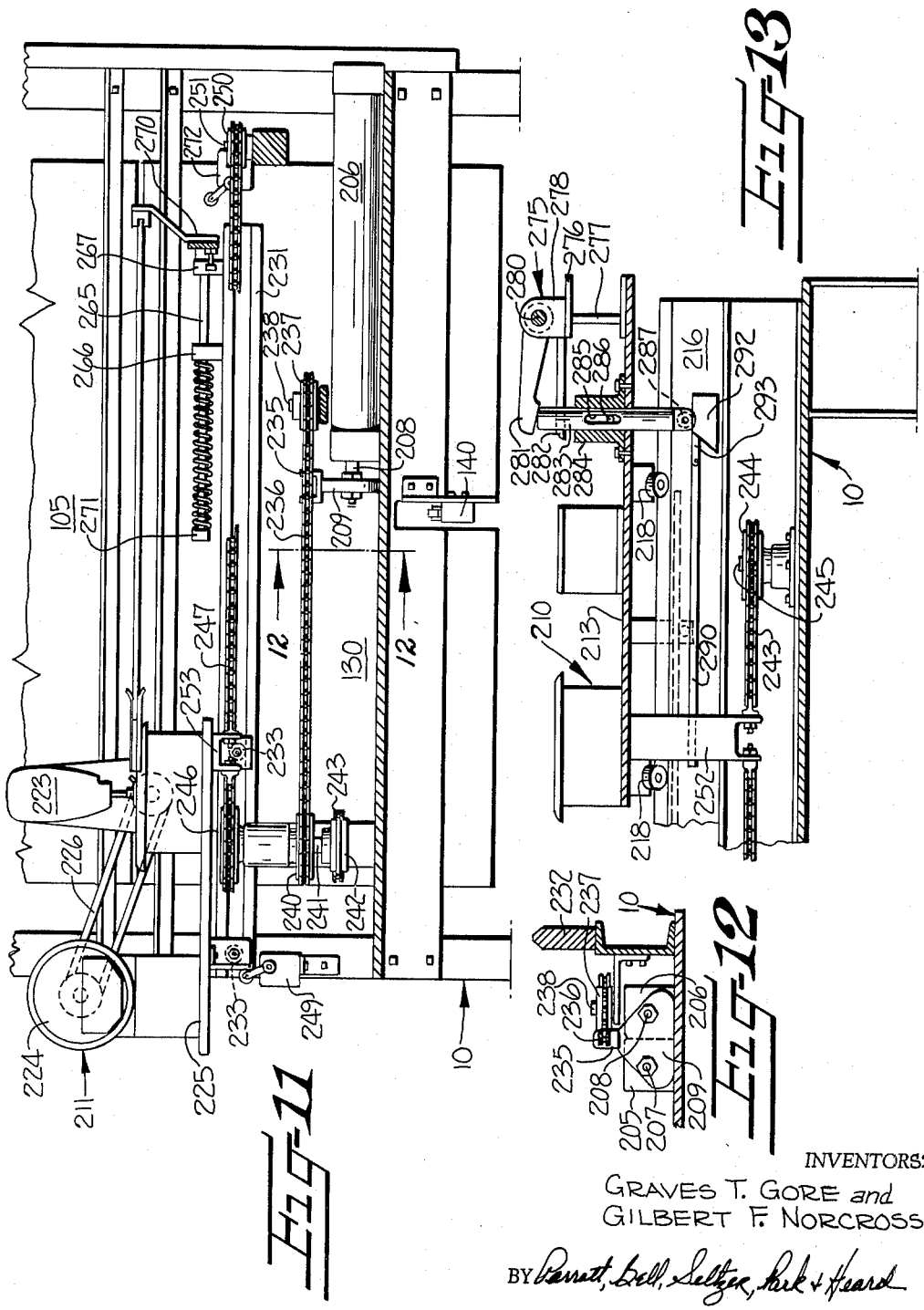

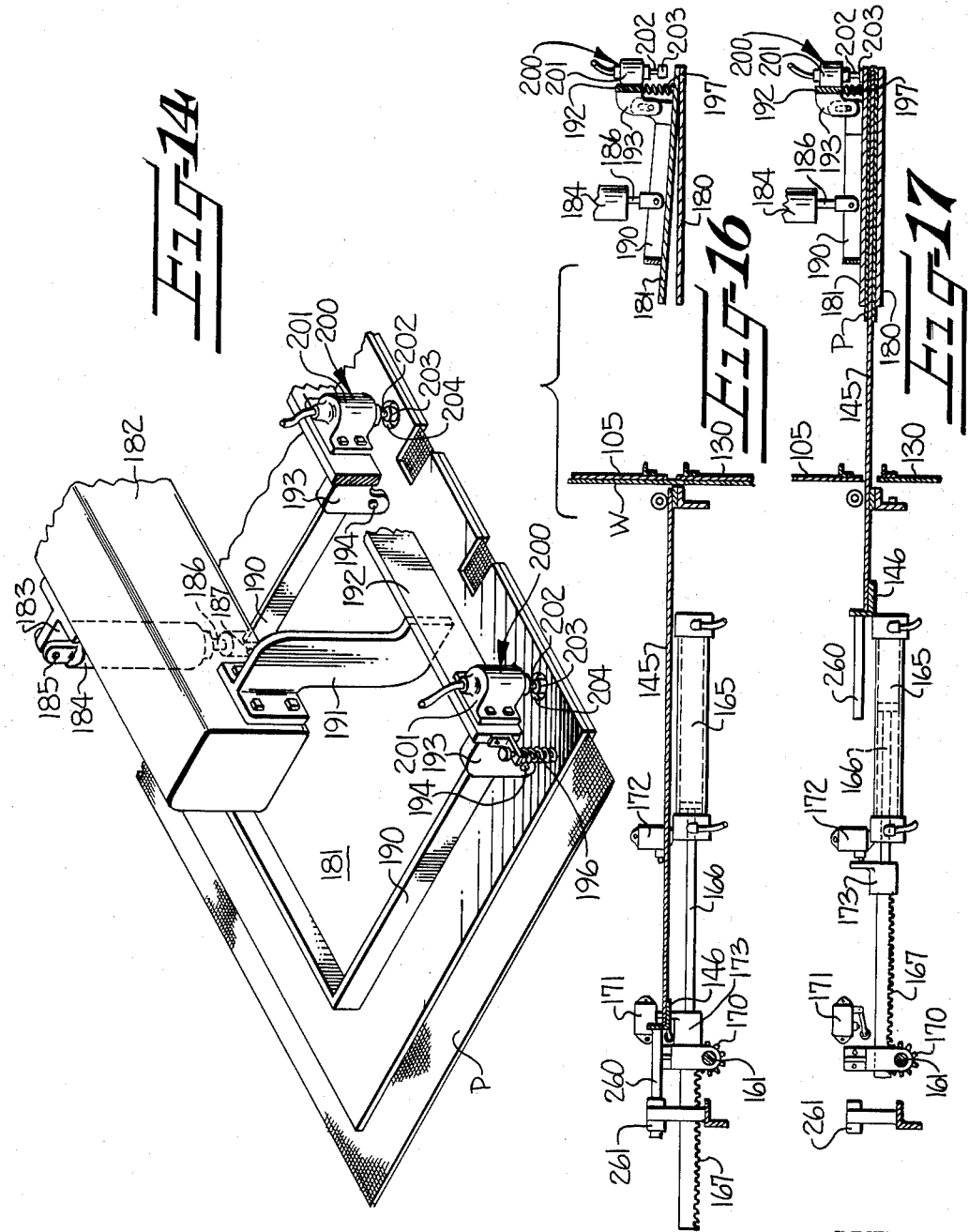

United States Patent Office 3,227,119
Patented Jan. 4, 1966

3,227,119
MECHANISM FOR AUTOMATICALLY PRODUCING PILLOW CASES, BAGS, AND THE LIKE
Graves T. Gore, Ware Shoals, S.C., and Gilbert F. Norcross, Greensboro, N.C., assignors to Riegel Textile Corporation, a corporation of Delaware
Filed Oct. 30, 1964, Ser. No. 407,689
4 Claims. (Cl. 112—10)

This invention relates to a mechanism and method for automatically producing pillow cases, bags and the like and more particularly to a mechanism and method for automatically forming pillow cases, bags and the like from an open width, continuous web of textile material.

In the prior manufacture of pillow cases, bags and the like, it was necessary to carry out a series of separate steps by a series of separate operators, either manually or with separate machines. This necessarily involved the disadvantages of a large number of operators, time consumption, inefficiency and costliness. Another disadvantage of this type of manufacture was the amount of space necessary to hold these separate machines and operators. Also, the human element involved in these separate operations by separate operators produced a tendency toward non-uniformity in the finished product.

It is therefore an object of this invention to provide a mechanism and method for automatically carrying out various steps in the manufacturing of pillow cases, bags and the like which will eliminate various operators, cut down on time consumption, increase efficiency, reduce cost, conserve space and increase uniformity in the finished product.

In accordance with this invention an automatic mechanism and method is provided whereby a continuous, open-width web of material is fed from a supply roll. The continuous web is folded over and hemmed along one longitudinal edge to provide a hemmed edge which will eventually form the open mouth of the pillow case, bag or the like. The hemmed continuous web is then led forward through the machine and cut in the transverse direction into individually cut pieces of predetermined length. These cut pieces are folded about a transverse axis so that the cut edges are superposed. The folded pieces are then sewed simultaneously along the unhemmed edge and along the cut edge to complete the pillow case, bag or the like having a hemmed opened mouth. The pillow cases, bags, or the like are then automatically stacked for easy removal by an operator. This mechanism and method makes it possible to automatically produce a pillow case, bag or the like without the necessity of utilizing individual operators and individual machines to perform the various steps necessary to form this product.

An illustrative, but non-limiting example of a means for performing the aforementioned folding operation is by utilizing a system of two holding plates and a pusher plate. The individually cut piece of material is held in a vertical plane immediately following cutting and the pusher plate which is disposed in a horizontal plane is moved to contact the cut piece along a transverse axis midway of the length of the cut piece. This pusher plate will move the cut piece forward and force it between two holding plates disposed in horizontal planes in superposed relationship and thereby sandwich the folded cut piece between the holding plates in a horizontal plane for the sewing operations.

An illustrative, but non-limiting example of a means for performing the aforementioned sewing operations is by utilizing two traveling sewing machines adapted to transverse paths of travel disposed at 90° to each other. The first sewing machine is so located that it will travel along the unhemmed superposed edge of the material which is sandwiched between the holding plates to place a seam therein. Simultaneously with this first sewing operation, the second machine, which is adapted to travel in a path disposed at 90° to the path of travel of the first machine begins its sewing operation and places a seam in the superposed material contained between the holding plate along the superposed cut edges thereof to complete the pillow case, bag or the like leaving the previously hemmed portion as the open mouth thereof.

Further features of the invention will be understood from a consideration of the following more detailed description taken in conjunction with the accompanying drawings in which:

FIGURE 1 is a perspective view of the pillow case, bag or the like which is produced by the mechanism of this invention;

FIGURE 2 is a side elevational view of one side of the mechanism of this invention;

FIGURE 3 is a side elevational view of the other side of the mechanism of this invention;

FIGURE 4 is a front elevational view of the mechanism of this invention;

FIGURE 5 is a rear elevational view of the mechanism of this invention;

FIGURE 6 is a sectional view taken substantially along the line 6—6 of FIGURE 4;

FIGURE 9 is a sectional view taken substantially along the line 9—9 of FIGURE 3 and illustrating the folding plate in the forward folding position;

FIGURE 10 is a sectional view similar to FIGURE 9 illustrating the folding plate in its rearward retracted position;

FIGURE 11 is a sectional view taken substantially along the line 11—11 of FIGURE 9;

FIGURE 12 is a sectional view taken substantially along the line 12—12 of FIGURE 11;

FIGURE 13 is a sectional view taken substantially along the line 13—13 of FIGURE 9;

FIGURE 14 is a partial perspective view of the mechanism for raising and lowering the holding plates and for clamping the folded cut web;

FIGURE 16 is a sectional view with parts removed of the pusher plate and drive therefor in the retracted position and illustrating the cooperating holding plates; and FIGURE 17 is a view similar to FIGURE 16 illustrating the pusher plate in its forward position between the holding plates.

Figure 7:
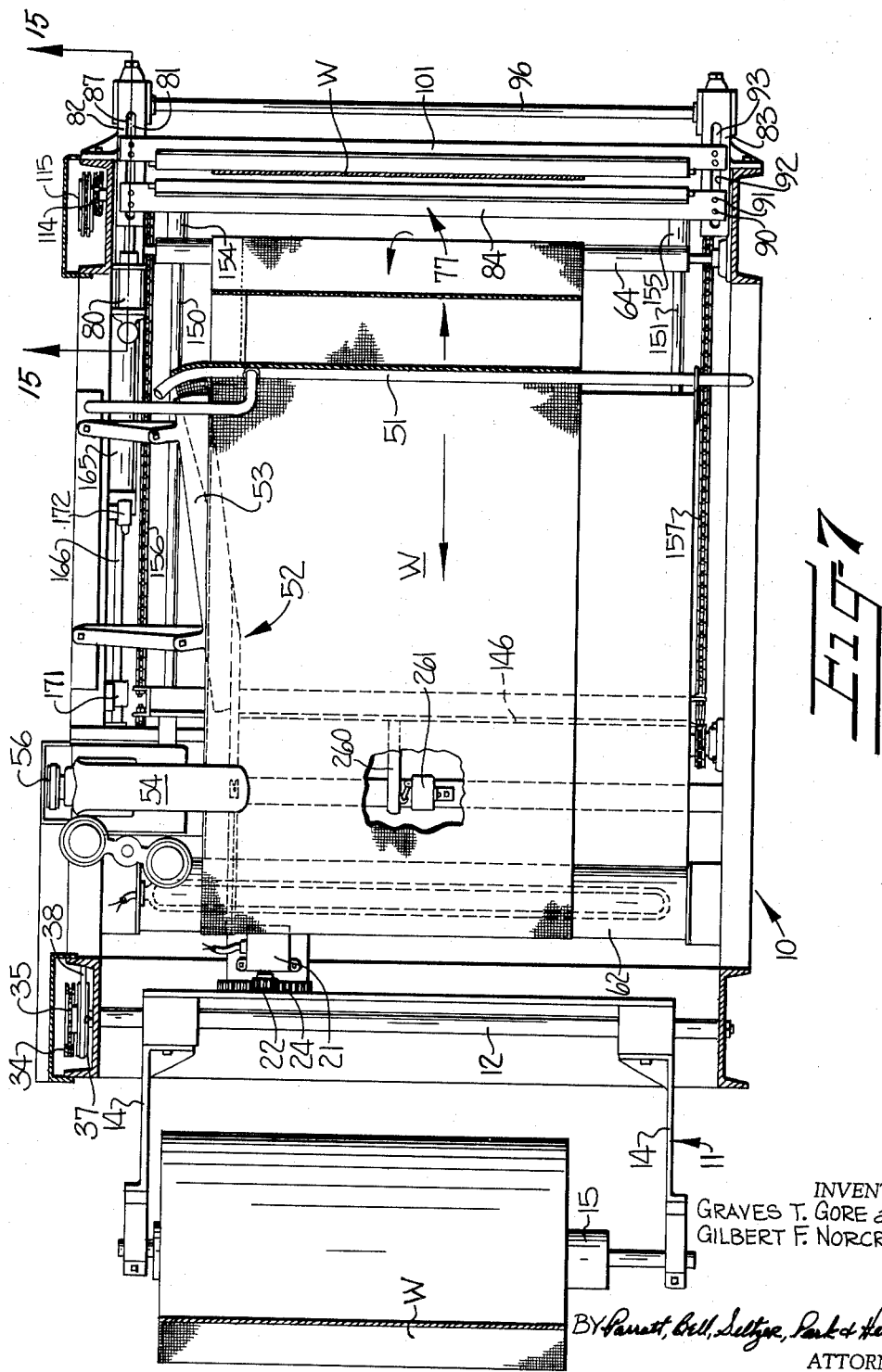
FIGURE 7 is a sectional view taken substantially along the line 7—7 of FIGURE 3.
Figure 8:
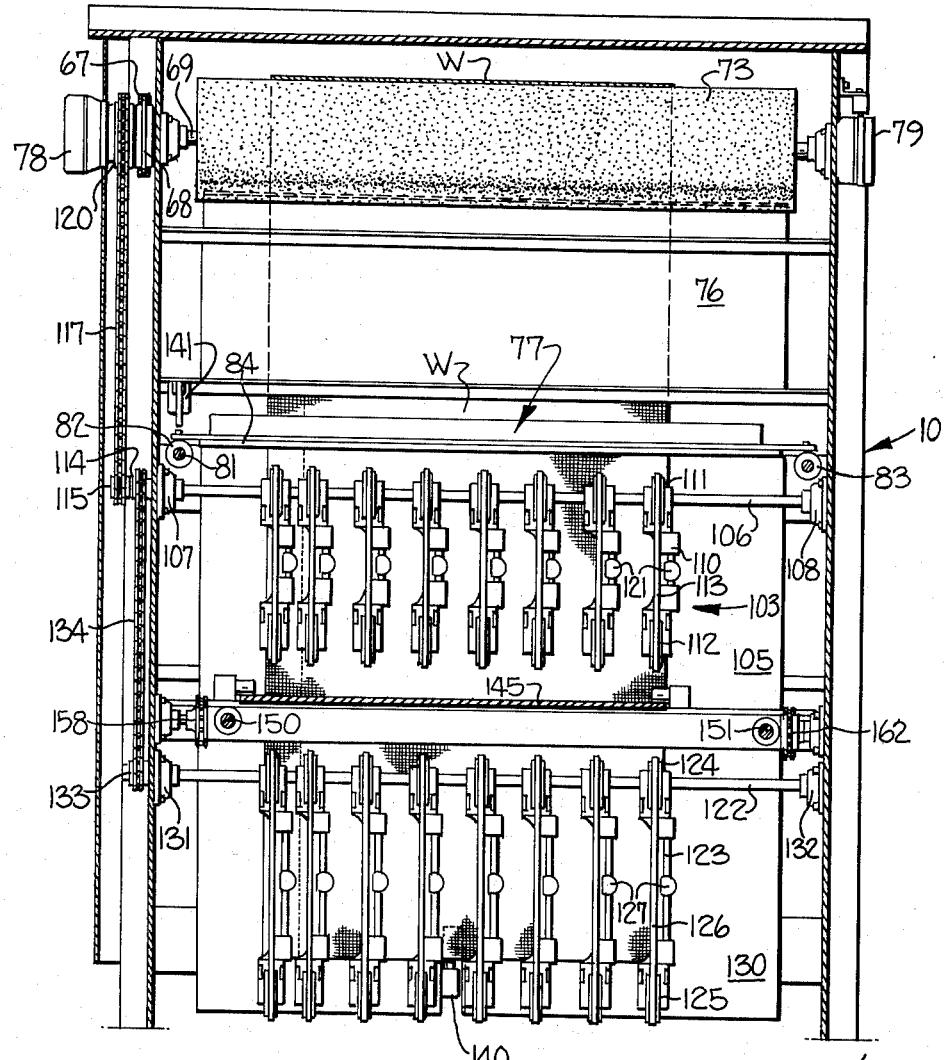
FIGURE 8 is a sectional view taken substantially along the line 8—8 of FIGURE 6.
Figure 15:
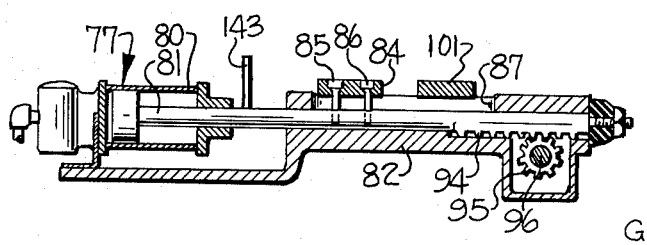
FIGURE 15 is a sectional view taken substantially along the line 15—15 of FIGURE 7.

Referring now to the drawings, there is shown in FIGURE 1 the pillow case, bag or the like P produced by the mechanism of this invention, the construction of which will become more apparent as the mechanism of this invention is described.

The mechanism for automatically producing pillow cases, bags and the like includes a stationary frame, generally indicated by the reference numeral 10. Mounted on the rear end of the stationary frame 10 is a web alignment mechanism, generally indicated by the reference numeral 11. The mechanism 11 comprises a pair of shafts 12 and 13 mounted between two upstanding portions of the stationary frame 10 and spaced from each other in a vertical plane, as may be seen in FIGURES 4, 6 and 7. A holding bracket 14 is slidably mounted on the shafts 12 and 13 and adapted to slide back and forth thereon in the transverse direction of the machine. A supply roll 15 containing a continuous web of textile material W is adapted to be mounted between the ends of the holding bracket 14 to supply the continuous web of material W to the machine for forming a pillow case, bag or the like.

It is important that the material W be fed to the machine in a straight line or path and to facilitate this the machine is provided with a sensing finger mechanism, generally indicated by the reference numeral 16. The continuous web of material W is led from the supply roll 15 over an idler roll 17 which is mounted in suitable bearings between upstanding portions of the stationary frame 10. From the idler roll 17 the web W is led past the sensing finger mechanism 16 and under roll 20 mounted also in suitable bearings between upstanding portions of the machine frame 10. The sensing finger mechanism 16 is electrically connected to a reversible motor 21 which includes a gear 22 mounted on the shaft 23 of the motor 21. The gear 22 is in engagement with a rack gear 24 secured to the holding bracket 14 so that as the sensing finger 16 senses a position of the web W either to the left or to the right of the desired path of travel thereof, the sensing finger mechanism 16 will actuate reversible motor 21 to rotate gear 22 to in turn move holding bracket 14 by means of rack gear 24 to the left or to the right on shafts 12 and 13 to correct the path of travel of the web W and insure that it also travels in a straight line. The supply roll 15 also includes a conventional weight mechanism 25 which offers frictional resistance to the turning of the roll 15 to prevent the roll 15 from rotating faster than the web W is being fed into the machine.

The web W passes from the idler roll 20 around a driven abrasive covered feed roll 26 and is fed from the supply roll 15 thereby. The abrasive covered feed roll 26 includes a shaft 27 mounted in bearings 30 and 31 on the upstanding portions of the stationary frame 10. The shaft 27 extends beyond bearing 30 and has sprocket gears 32 and 33 disposed on the outer end thereof. A chain 34 passes around sprocket 33 and around a sprocket 35 disposed on a stub shaft 36 mounted on the machine frame 10. The stub shaft 36 also has a sprocket gear 37 mounted thereon. A chain 38 passes around sprocket gear 37 and around a sprocket gear 40 mounted on a shaft 41 from a gear box mechanism 42. The gear box mechanism 42 is driven from the machine motor 43 by conventional mechanical linkages (not shown). Thus it may be seen, that the machine motor 43 drives gear box 42, to rotate sprocket 40, to drive chain 38, to rotate sprocket 37, to turn stub shaft 36, to rotate sprocket 35, to drive chain 34, to rotate sprocket 33 and thus drive abrasive covered feed roll 26 through shaft 27. The chain 34 also contacts a tension sprocket 44 to regulate the tension of chain 34.

Following the abrasive covered feed roll 26, the web W passes under roll 45 which maintains the proper tension in the web W and takes up any slack which might occur in the web. The roll 45 is a conventional take-up roll which is mounted in a ratchet mechanism 46 which is carried by the stationary machine frame 10 to move up and down therein in a manner well understood by those with ordinary skill in the art.

From the roll 45, the web W passes over idler roll 47 mounted on the stationary machine frame 10, over idler roll 50 carried by the machine frame and then under guide rod 51 mounted on the machine frame to be led to the hemming mechanism generally indicated by the reference numeral 52. It is noted, that the face of the web W is inverted by passing over guide roll 50 and under guide arm 51 so that the proper face of the web W is presented to the hemming mechanism 52 for turning over and hemming one longitudinal edge of the web W.

The hemming mechanism 52 comprises a conventional edge turning apparatus 53 mounted on the stationary frame 10 for turning over one longitudinal edge of the web W and a sewing machine 54 for hemming the turned over edge of the web W. The sewing machine 54 includes a main drive shaft 55 having a pulley 56 thereon which is driven by a belt 57 passing around a double pulley 58 rotatably mounted on the machine frame 10 and driven by a belt 60 from a pulley 61 mounted on the machine motor 43. Thus the web W passes under guide rod 51 through edge turning mechanism 53 and under sewing machine 54 so that one longitudinal edge thereof is turned over and hemmed to eventually form the mouth of the bag, pillow case or the like.

After this hemming operation, the hemmed web W passes around a heated roll 62 mounted on the stationary machine frame 10 and containing a calrod heating unit 63. This heated roll 62 presses the hemmed edge of the web W.

From the heated roll 62 the hemmed web W passes under idler roll 64 which is mounted on stationary machine frame 10 and then over driven feed roll 65. The feed roll 65 is carried by the stationary machine frame 10 and has a sprocket 66 disposed on one of the outer ends thereof. The sprocket 32, driven in the manner described above, has a chain 67 passing therearound. The chain 67 also passes around a sprocket 68 and around the sprocket 66 to drive the feed roll 65.

From the feed roll 65 the hemmed web W passes under roll 70 which controls the tension in the web W and takes up any slack which might occur therein by being mounted in ratchet mechanism 71 carried by the stationary machine frame 10 and which operates in the same manner as does take-up roll 45. A switch 72 is mounted adjacent the roll 70 and is electrically connected to the machine motor 43. The roll 70 is adapted to actuate the switch 72 to stop operation of the machine when the slack in the hemmed web W has decreased to a point which increases the tension therein above a desired amount.

From the roll 70, the hemmed web W passes over driven abrasive covered feed roll 73, the shaft 69 of which is mounted in suitable bearings on the machine frame 10 and has sprocket 68 disposed on the outer end thereof to be driven by the chain 67 in the manner described above. The shaft 69 also includes an electrically operated clutch device 78 on one end thereof which must be in engagement for the sprocket 68 to drive shaft 69 and abrasive covered roll 73. The shaft 69 has an electrically operated brake device 79 on the other end thereof, the purpose of which will be explained hereinafter.

From the abrasive covered feed roll 73, the hemmed web W passes between guide plates 75 and 76 mounted on the stationary machine frame 10. The hemmed web then passes a pneumatically operated cutter mechanism, generally indicated by reference numeral 77. The cutting mechanism 77 comprises a pneumatic cylinder 80 adapted to receive air from any convenient source of supply (not shown) to be actuated thereby in both a forward and reverse direction. The air cylinder 80 is mounted on the stationary machine frame 10 and includes a forwardly extending shaft 81. As may be seen in FIGURE 7, the cylinder 80 and forwardly extending shaft 81 are disposed on one side of the machine. Disposed immediately above the forwardly extending shaft 81 is a support plate 82 mounted on the stationary frame 10. A similar support plate 83 is mounted on the other side of the machine transversely across from the support plate 82. A movable cutting blade 84 is slidably carried on top of support plates 82 and 83 and includes downwardly extending pins 85 and 86 passing through aperture 87 in support plate 82 and secured to the forwardly extending shaft 81 from pneumatic cylinder 80. The other end of the movable blade 84 includes downwardly extending pins 90 and 91 which extend through aperture 92 in support plate 83. These pins 90 and 91 are secured to a stub shaft 93 disposed below support plate 83 and suitably mounted on the stationary frame 10 for reciprocating motion with shaft 81. The shaft 81 includes gear teeth 94 on the bottom thereof which mesh with gear teeth 95 on a transversely extending shaft 96. The shaft 96 also has gear teeth on the other end thereof which mesh with gear teeth on the bottom of shaft 93 (not shown) so that the shaft 81 extending from cylinder 80 will drive the stub shaft 92 through the described gearing on shaft 96 to insure the proper distribution of forces on the forward movement of cutting blade 84.

Cooperating with moving cutting blade 84 is a fixed cutting blade 100 secured to the stationary machine frame. The fixed cutting blade 100 has disposed thereover a spring biased bumper member 101 which is slidably carried on support plates 82 and 83 by downwardly projecting pins extending through apertures 87 and 92. The bumper member 101 is spring biased (not shown) by any suitable means toward the movable blade 84 to the position shown in FIGURE 6. When the cutting mechanism 77 is actuated by the introduction of air into the pneumatic cylinder 80 the shaft 81 carrying movable blade 84 will move forward driving the stub shaft 93 forward to bring movable blade 84 into contact with fixed blade 100 to transversely cut the hemmed web of material W. Upon contact of the movable blade 84 with the bumper member 101, the bumper member 101 will be pushed against its bias by the movable blade 84 and will return to the position of FIGURE 6 upon retraction of the removable blade 84.

In order to cut the hemmed web of material W into predetermined lengths, it is necessary for the web to pass the cutter mechanism before the cutter mechanism is actuated so that a predetermined length of web W has passed the cutter mechanism. Therefore, the web W travels from the guide plates 75 and 76 past the unactuated cutter mechanism 77 through a pair of belt conveyor mechanisms, generally indicated by the reference numerals 103 and 104.

The belt conveyor mechanism 103 comprises a guide plate 105 mounted on the stationary machine frame 10, a shaft 106 mounted in suitable bearings 107 and 108 on the stationary machine frame 10 and carrying a plurality of downwardly extending arms 110. Each end of each of the arms 110 has pulleys 111 and 112 thereon. The pulleys 111 are keyed to the shaft 106 and are rotated thereby. Passing around the pulleys 111 and 112 are belts 113 which are adapted to contact the guide plate 105 to squeeze the hemmed web W therebetween for conveying the web W as the belts 111 are rotated.

The shaft 106 has sprockets 114 and 115 disposed on one end thereof. The sprocket 115 is driven by a chain 117 passing therearound and passing around a sprocket 120 on the shaft 69 of the abrasive covered feed roll 73. Thus it may be seen, that the shaft 106 is driven through sprocket 120, chain 117 and sprocket 115 simultaneously with the above described drive of the abrasive feed roll 73. The belts 113 are rotated by shaft 106 through pulleys 111 and 112 to convey the web W between the belts 113 and the guide plate 105. The belts 113 are maintained in contact with the web W to sandwich the web W between the belts 113 and the guide plate 105 by weights 121 disposed on each of the arms 110.

The web W passes from belt conveying mechanism 103 into belt conveying mechanism 104 which is constructed the same as belt conveying mechanism 103 and includes a driven shaft 122 and a plurality of arms 123 having pulleys 124 and 125 on each end thereof surrounded by belts 126 adapted to contact a guide plate 130 mounted on the stationary machine frame 10 and spaced slightly from the guide plate 105 in the direction of travel of the hemmed web W. The pulleys 124 are similarly keyed to the shaft 122 to be driven thereby and to drive the belts 126. The shaft 122 is mounted in bearings 131 and 132 on the stationary machine frame 10 and one end thereof has mounted thereon a sprocket gear 133 which is driven by a chain 134 passing therearound and passing around sprocket 114 to be driven thereby. The belts 126 are similarly maintained in contact with the web W by the weights 127 disposed on each of the arms 123. Thus it may be seen, that the belt conveying mechanisms 103 and 104 are driven simultaneously with each other to convey the hemmed web of material W downwardly in a vertical plane from the abrasive covered feed roll 73 past the cutter mechanism 77.

In operation, as the hemmed web W passes down through belt conveying mechanisms 103 and 104, the end thereof is adapted to contact a switch 140 mounted on the machine frame adjacent the bottom of belt conveying mechanism 104. The switch 140 is suitably connected to clutch device 78 and brake device 79 to disengage clutch device 78 and apply brake device 79 to momentarily stop the feed of the hemmed web W by the abrasive covered feed roll 73. The switch 140 is also suitably connected to the cutting mechanism 77 to cause the delivery of air to the cylinder 80 for actuation of the cutting mechanism 77. It is noted, that the distance between cutting mechanism 77 and switch 140 is the desired predetermined length to which the web W is to be cut for pillow cases, bags or the like P.

Associated with the cutting mechanism 77 is a pair of switches 141 and 142. When the cutting mechanism is in its rearward retracted position, as shown in FIGURE 6, an extension 143 from the shaft 81 is in engagement with the switch 141. When the switch 141 is engaged by the extension 143, introduction of air under the control of switch 140 will direct the air to the cylinder 80 will cause the shaft 81 and thus the movable blade 84 to move forward allowing the movable blade 84 to contact the fixed blade 100 to effect cutting of the web W. Upon a forward movement of the shaft 81 and movable cutting blade 84, the extension 143 will contact the switch 142. When the switch 142 is contacted the action of the fluid or air on cylinder 80 will be reversed and the movable blade 84 and shaft 81 will be retracted to the position shown in FIGURE 6 which will again engage the switch 141 following cutting of the web W.

The switch 140 is suitably connected to a control relay, diagrammatically illustrated as 149 in FIGURE 6. The control relay is a safety device and is suitably connected to the main machine motor 43. The control relay 149 is adapted to be reset by actuation of the switch 140 to continue operation of the machine motor 43. If the control relay 149 is not reset within predetermined timed intervals, it will stop operation of the machine motor 43 to stop operation of the entire mechanism. This would occur if the web W failed to contact the switch 140 due to some malfunction of the travel of the web W. If this control mechanism was not incorporated in the machine, constant observation would be required by an operator.

Following cutting of the web W by the above described action, it is then necessary to fold this cut pillow case P so that the cut edges, hemmed edges and uncut edges are superposed to facilitate the subsequent sewing of the superposed cut and uncut edges to form the pillow case, bag or the like. The folding mechanism of this machine, which is disposed between the belt conveying mechanisms 103 and 104, comprises a pusher plate 145 mounted at the rear end thereof on an angle bracket 146. The angle bracket 146 is mounted on slides 147 and 148 carried by slide rods 150 and 151. The slide rods 150 and 151 are mounted on the stationary machine frame 10 and have bumper members 152, 153 and 154, 155, respectively, on the ends thereof. The slides 147 and 148 are adapted to slide back and forth on the slide rods 150 and 151. The angle bracket 146 has mounted thereon, at each end thereof, the ends of chains 156 and 157, as shown in FIGURE 10. The chain 156 is disposed around idler sprocket 158 rotatably mounted on the stationary machine frame 10 and around driven sprocket 160 mounted on rotatable shaft 161 carried by suitable bearings on the machine frame 10. The chain 157 is carried by idler sprocket 162 rotatably mounted on the stationary machine frame 10 and by driven sprocket 163 carried by the driven shaft 161.

For actuating the folding mechanism, there is provided a pneumatic cylinder 165 mounted on the stationary machine frame 10 and disposed adjacent the chain 156. The cylinder 165 is adapted to receive air from any convenient source of supply (not shown) and includes an outwardly extending shaft 166 which is adapted to be retracted toward and away from the cylinder 165 by the introduction of air into the cylinder 165. The switch 140 is suitably connected to the cylinder 165 to cause the delivery of air thereto for actuating the folding mechanism. The outer end of the shaft 166 has teeth 167 on the bottom thereof which mesh with sprocket gear 170 fixed on the shaft 161 for rotation thereof. Therefore, as the pneumatic cylinder 165 is actuated to move the shaft 166 toward or away from it, the gear teeth 167 will rotate sprocket 170 to turn shaft 161 to rotate sprockets 160 and 163 to rotate chains 156 and 157 to move pusher plate 145 to fold the cut pillow case P.

The pusher plate 145 is adapted to be moved, by the above described mechanisms, between the guide plates 105 and 130 to engage the individually cut pillow case P transversely across the midpoint thereof and force the cut length between the guide plates 105 and 130 for the folding action.

In operation, when the web W engages switch 140, the switch 140 causes the delivery of air to the cylinder 165 for actuation of the folding mechanism. Associated with the folding mechanism is a pair of switches 171 and 172 mounted on the stationary frame adjacent the outwardly extending shaft 166 from the cylinder 165. When the folding mechanism is in its rearward retracted position, as shown in FIGURE 10, an extension 173 from the shaft 166 is in engagement with the switch 172. When the switch 171 is engaged by the extension 173, introduction of air to the cylinder 165 will cause the shaft 166 and thus the pusher plate 145 to move forwardly by the action of teeth 167 on sprocket 170 causing shaft 161 to rotate chains 156 and 157. This action will cause the pusher plate 145 to engage the cut length transversely across its midpoint and force it between the opening formed by guide plates 105 and 130 to effect folding of the cut length. This switch 171 is also suitably connected to the cutting mechanism and prevents cutting of the web W unless it is engaged by the extension 173. This prevents multiple actuation of the cutting mechanism by the switch 140 before the folding action has taken place.

Upon the forward movement of the shaft 166 and the pusher plate 145, the extension 173 will contact the switch 172. When the switch 172 is contacted the action of the cylinder 165 will be reversed and the pusher plate 145 and shaft 166 will be retracted to the position shown in FIGURE 10 which will again engage the switch 171 following the folding of the cut length of the pillow case P. The switch 171 is also suitably connected to clutch device 78 and brake device 79 so that when the extension 173 disengages the switch 171 during the forward movement of the folding mechanism, the previously disengaged clutch device 78 will again be engaged and the previously engaged brake device will be disengaged to allow the feeding action of the abrasive covered roll 73 to be resumed.

It is noted that the above described action of the cutting mechanism 77 and the folding mechanism is accomplished very quickly and the feeding motion of abrasive covered feed roll 73 will be interrupted only momentarily and any slack which occurs in the continuous web W will be taken up by the roll 70.

Cooperating with the above described action of the pusher plate 145 to receive and hold the folded cut pillow case P is a pair of holding plates 180 and 181 superimposed over each other. The bottom holding plate 180 is mounted stationary on the machine frame 10 and the top plate 181 is adapted to be moved toward and away from the bottom plate for entry of the folded cut pillow case P and the pusher plate 145 therebetween when the holding plate 181 is spaced from the holding plate 180 and to hold the pillow case P therebetween when the pusher plate 145 is retracted.

For mounting the upper holding plate 181 there is provided an arm 182 mounted on the stationary frame and extending transversely across the machine over the upper holding plate 181. The arm 182 has a bracket 183 extending therefrom to which is pivoted at 185 a pneumatic cylinder 184. The cylinder 184 includes piston rod 186 which is pivoted at 187 to a bracket 190 secured to the upper surface of the upper holding plate 181. The arm 182 also includes two extensions 191 secured thereto and extending downwardly therefrom. The extensions 191 are secured to and carry an arm member 192 extending substantially across the superposed holding plates 180 and 181. The arm 192 includes three extensions 193 which are pivoted to portions of the bracket 190 by pin members 194 extending from block members 195 secured to the bracket 190 through elongate apertures in each of the extensions 193. This connection provides second pivot points between the top holding plate 181 and the arm member 182. Spring devices 196 and 197 are disposed on each end of the bracket member 192 to bear against the rear portion of upper holding plate 181 so that when the cylinder 184 and piston rod 186 lift the upper holding plate 181, the upper holding plate will assume a canted position, as shown in FIGURE 16.

Secured on the bracket 192 are three clamping devices, generally indicated by reference numeral 200. These devices comprise pneumatic cylinders 201 secured to the bracket 192, piston rods 202 and clamp portions 203 which may be rubber or any suitable material for clamping the folded cut pillow case P. The clamping portions 203 are adapted to move through apertures 204 in the upper holding plate 181 to clamp the folded cut pillow case P against the bottom holding plate 180 under the action of cylinders 201. The cylinders 201 are adapted to receive air from any convenient source of supply (not shown) to move the piston rod 202 and clamping members 203 into clamping engagement. The clamping mechanisms 200 also include biasing means (not shown) for retracting the piston rods 202 and clamping members 203 from clamping engagement when air is not introduced into the pneumatic cylinders 201.

In operation, before the pusher plate 145 has advanced to fold the cut length of pillow case P, the holding plates 180 and 181 are in the positions illustrated in FIGURE 16 with the pneumatic cylinder 184 being actuated to hold the upper holding plate 181 in its raised position canted for reception of the folded cut pillow case P. The cylinders 201 are deactivated and the biasing means therein are holding the piston rods 202 and clamping members 203 in their upper positions.

When the pusher plate 145 is actuated by the switch 140, it will begin its folding action, as described above, carrying the cut length of pillow case P therewith and push the cut length between the holding plates 180 and 181, as shown in FIGURE 17. The switch 172 is engaged by the extension 173 when the pusher plate 145 has reached its forward position to reverse the movement of the pusher plate 145. The switch 172 also actuates pneumatic cylinders 201 to allow air to flow therein to push piston rods 202 downwardly to cause clamping portions 203 to clamp the folded edge of the cut pillow case P against the bottom holding plate 180 so that the pusher plate 145 may be retracted leaving the cut length of pillow case P between holding plates 180 and 181. Simultaneously, the switch 172 de-activates the pneumatic cylinder 184 to allow the upper holding plate to fall by its own weight upon the folded pillow case P and the retracting pusher plate 145.

As may be seen in FIGURE 14, the holding plates 180 and 181 are smaller than the folded cut pillow case P so that the superposed unhemmed edges and the superposed cut edges thereof extend outwardly from the holding plates for the subsequent sewing operations.

For sewing the superposed unhemmed edges and cut edges while the folded pillow case is maintained between the holding plates 180 and 181, there are provided two sewing mechanisms, generally indicated by the reference numerals 210 and 211. The sewing mechanisms 210 and 211 are adapted to travel along the superposed unhemmed edges and the superposed cut edges, respectively, in paths disposed at 90° to each other for sewing these edges to form the pillow case, bag or the like P leaving the previously hemmed superposed edges as the open mouth thereof.

The sewing mechanism 210 comprises a sewing machine 212 and a motor 214 mounted on a carriage 213. The carriage 213 is supported on elongate track members 215 and 216 mounted on the stationary frame 10 of the machine by roller members 217 and 218, respectively, as may be seen more clearly in FIGURE 5. The track members 215 and 216 extend along the superposed unhemmed edges of the folded pillow case being held between the holding plates 180 and 181 and for some distance beyond the folded pillow case P, as may be seen in FIGURES 9 and 10. The sewing machine 212 is driven by a belt 220 which passes around a pulley 221 on the main shaft of the sewing machine and around a pulley 222 driven by a clutch 219 on the driven shaft of the motor.

Similarly, the sewing mechanism 211 comprises a sewing machine 223 and a motor 224 mounted on a carriage 225. The sewing machine 223 is driven by a belt 226 passing around a pulley 227 on the main shaft of the sewing machine and a pulley 230 driven by a clutch 229 on the driven shaft of the motor. The carriage 225 is supported on elongate tracks 231 and 232 mounted on the stationary machine frame 10 by roller devices 233 and 234, respectively, as may be seen in FIGURE 2. The tracks 231 and 232 extend along the superposed cut edges of the folded pillow case retained between the holding plates 180 and 181.

For driving the sewing mechanisms 210 and 211 along their respective tracks for stitching the superposed unhemmed edges and the superposed cut edges of the pillow case P, a drive mechanism is provided. The drive mechanism comprises a pair of pneumatic cylinders 205 and 206 mounted on the stationary frame 10. The cylinders 205 and 206 are adapted to receive air from any convenient source of supply (not shown) and are double acting. The cylinder 205 includes a piston rod 207 and the cylinder 206 includes a piston rod 208. The forward ends of the piston rods 207 and 208 are interconnected by a bracket 209 which has an upwardly extending portion 235 connected to a chain 236. The chain 236 is disposed around a sprocket 237 suitably mounted on a rotatable shaft 238 carried by bearings on the stationary machine frame 10 and around a sprocket 240 mounted on a rotatable shaft 241 carried by bearings on the machine frame 10. The shaft 241 also includes a sprocket 242 around which is disposed a chain 243 which passes around another sprocket 244 suitably mounted on a rotatable shaft 245 carried by bearings on the machine frame 10. The rotatable shaft 241 also has a sprocket 246 mounted thereon which carries a chain 247 which passes around a sprocket 250 suitably mounted on a shaft 251 carried by bearings on the machine frame 10. The carriage 213 of sewing mechanism 210 is drivingly secured to the driven chain 243 by bracket 252 and the carriage 255 of the sewing mechanism 211 is drivingly secured to the driven chain 247 by a bracket 253. As the cylinders 205 and 206 are actuated by the introduction of air therein to move piston rods 207 and 208 outwardly therefrom, the piston rods 207 and 208, by the connection of member 209 to chain 236, will drive chain 236 to rotate sprocket 240 and thus shaft 241 to rotate sprockets 242 and 246 to rotate chains 236 and 247 to drive carriages 213 and 225 of sewing mechanism 210, 211 all along their respective tracks 216, 215 and 231, 232.

In operation, as the folding mechanism retracts from its forward position between the holding plates 180 and 181 to its rearward position, an extension 260 mounted on the angle 146 will contact a switch 261 suitably mounted on the stationary machine frame 10. The switch 261 is suitably connected to the cylinders 230 and 231 to cause the introduction of air into the cylinders 230 and 231 to cause the piston rods 207 and 208 to be moved progressively outwardly which will drive the sewing devices 210 and 211 along their paths of travel for stitching the superposed unhemmed edges and superposed cut edges of the folded pillow case P retained between the folding plates 180 and 181.

The carriage 225 of the sewing mechanism 211 is in engagement with two switches 248 and 249 suitably mounted on the machine frame 10. When the carriage 225 has disengaged switch 248 upon the forward movement thereof, the switch 248, which is suitably connected to clutches 219 and 229, will actuate these clutches to start operation of the sewing machines 212 and 223. The switch 248 is also suitably connected to the cylinder 184 and is adapted to cause the flow of air therein when it is disengaged to move the upper holding plate 181 into clamping engagement with the lower holding plate 180. The switch 249 is suitably connected to the folding mechanism and is adapted to prevent actuation thereof unless the switch 249 is engaged by the carriage 225 in the rearward position thereof.

When the sewing mechanism 211 has progressed near the end of its forward path of travel, the carriage 225 will engage a spring biased bumper mechanism comprising a shaft 265 slidably retained in collars 266 and 267, a switch engaging portion 270 on one end thereof, a spring retaining member 271 on the other end thereof, and a coiled spring surrounding the shaft 265 disposed between collar member 266 and spring retaining member 271 for biasing the shaft 265 toward the sewing mechanism 211. As the shaft 265 of the bumper mechanism is pushed forwardly by the carriage 225, the switch engaging portion 270 will engage a switch 272. The switch 272 is adapted when engaged to reverse the flow of air to the double acting cylinders 205 and 206 to retract the pistons rods 207 and 208 to return the sewing mechanisms 210 and 211 to the starting positions previously occupied, as shown in FIGURE 9. The switch 272 is also adapted when engaged to disengage the clutches 219 and 299 to stop operation of the sewing machines 212 and 223. The switch 272 is further adapted when engaged to reverse the flow of air to cylinder 184 for raising the upper holding plate 181 and is adapted to stop the flow of air to the cylinders 201 to allow the clamping devices 200 to release their clamping engagement with the cut, folded and sewn pillow case P for the subsequent action of the stacking mechanism.

Thus it may be seen, that the sewing mechanisms 210 and 211 have now applied lines of stitching along the superposed unhemmed edges and the superposed cut edges of the folded pillow case being retained between holding plates 180 and 181 to complete the construction of the pillow case P leaving the previously hemmed superposed edges open to form the mouth of the pillow case, bag or the like. It is noted that as thus constructed, the completed pillow case, bag or the like P is inside out and will have to be inverted either manually or by a separate machine upon withdrawal by an operator.

Following completion of the pillow case, bag or the like P, an automatic stacking device, generally indicated by the reference numeral 275, is provided. The stacking mechanism 275 comprises an arm 276 carried by a support 277 mounted on the carriage 213. The arm 276 has four upstanding portions 278 which rotatably support a shaft 280 extending through apertures therein. The shaft 280 has fixed thereto five upper clamping members 281. The arm 276 has fixed thereto four lower clamping members 282, as may be seen in FIGURE 13, disposed below four of the upper clamping members 281 for co-operation therewith.

A cam mechanism is provided for holding the upper clamping members 281 spaced from the lower clamping members 282 until it is desired to clamp the finished pillow case P and pull it from the holding plates 180 and 181. The cam mechanism comprises a shaft 283 slidably passing through an aperture in support member 284 and an aperture in carriage 213. The shaft 283 has an elongate slot 285 therein through which passes a pin 286 secured in the support member 284 for limiting the upward and downward movement of the shaft 283 with respect to the support 284. The shaft 283 has a roller 287 on the bottom end thereof for engagement with a track member 290 so that when the roller 287 is disposed on top of the track member 290, as shown in FIGURE 13, the upper end of the shaft 283 will engage the fifth upper clamping member 281 to raise the fifth clamping member 281 and thus raise the other clamping members 281 to maintain them out of engagement with the lower clamping members 282. It is noted that the fifth upper clamping member 281 has no lower clamping member 282 disposed thereunder so that the only purpose of this fifth clamping member 281 is to act as a camming mechanism in raising and maintaining the other upper clamping members 281 out of engagement with the lower clamping members 282.

In operation, the stacking device 275 travels with the carriage 213 and thus with the sewing mechanism 210 in the forward movement of the sewing mechanism 210, by the above described driving action, so that when the sewing machine 210 completes its line of stitching and reaches the end of the superposed unhemmed edges of the folded pillow case P retained between the upper and lower holding plates 181 and 180, the roller 287 maintaining the shaft 283 in its upper position to hold the upper clamping members 281 out of engagement with the lower clamping members 282 will run off the end of the track 290 and drop to a position below the track 290. This will allow the upper clamping members 281 to drop into engagement with the lower clamping members 282 to allow the clamping members 281 and 282 to grip the pillow case P being held between the holding plates 180 and 181 so that the pillow case P will extend into these cut outs 291 for the clamping action of the stacking mechanism 275, as may be seen in FIGURES 9 and 10.

Thus, when the roller 287 drops off the end of track 290 the clamping members 281 and 282 will clamp and grip the pillow case P for withdrawal from the holding plates. It is noted that when this clamping action occurs, the switch 272 has been engaged to release the clamping action of clamping mechanisms 200 and to raise the upper holding plate 181 from the lower holding plate 180 so that the finished pillow case P may be withdrawn by the stacking mechanism 275. Also, the switch 272 has reversed the movement of sewing mechanisms 210 and 211 so that as the carriage 213 moves to its retracted position, the clamping members 280 and 281 will carry the finished pillow case P therewith from the position between the holding plates 180 and 181, as shown in FIGURE 9. The shaft 283 and the roller 287 will be in their lower positions during this retracting movement of the stacking mechanism 275 and the roller 287 will pass under the track 290 until it reaches a cam block 292. When the roller 287 reaches this cam block 292 it will ride up the inclined surface thereof and pivot portion 293 of the tract 290 so that the roller 287 will again be located on top of the track 290. As the roller rides up cam block 292, the shaft 283 will be raised to raise clamping members 281 from the clamping members 282 to release the engagement of the finished pillow case P. This releasing action will allow the pillow case P to drop onto a receiving platform 294 to be stacked for subsequent removal by an operator.

It may thus be seen that the above described mechanism has presented a fully automatic machine which will construct a bag, pillow case or the like from a continuous web of material and stack these finished pillow cases, bags or the like for removal by an operator without interruption in the operation of the machine and without separate steps by individual operators of separate machines.

This invention has been described in detail above for purposes of illustration and is not intended to be limited by this description or otherwise except as defined in the appended claims.

What is claimed is:

1. A mechanism for automatically producing pillow cases, bags and the like comprising a stationary frame, means for supplying a continuous open width web of material, means for feeding the open width continuous web of material through said mechanism, means for automatically cutting the web into individually cut pieces of a predetermined length, means associated with said cutting means for folding and holding the individually cut pieces so that the edges are in superposed relationship comprising a pair of superposed holding plates for receiving and holding the individually cut pieces and a movable pusher plate adapted to contact the cut unfolded piece transversely across its midpoint to push the cut length into a folded position between said holding plates, one of said holding plates being mounted stationary on said frame and the other of said holding plates being movably mounted on said frame so as to be adapted to assume a position slightly spaced from said stationary holding plate for reception of the folded cut length and so as to be adapted to assume a position in contact with said stationary plate for clamping said folded cut length therebetween, said movable pusher plate being adapted to fold and push the cut length into a folded position between said holding plates, means associated with said holding means for securing the folded superposed cut and uncut edges to form a pillow case, bag or the like.

2. A mechanism for automatically producing pillow cases, bags and the like as set forth in claim 1, in which said means for securing the folded pieces along the superposed cut and uncut edges comprises a first sewing mechanism movably mounted on said stationary frame and adapted to move along the superposed cut edges of the folded pillow case, bag or the like to insert a line of stitching therein and a second sewing mechanism movably mounted on said stationary frame and adapted to move along the superposed uncut edges along a path disposed at 90° to the path of said first sewing mechanism for inserting a line of stitching therein.

3. A cutting and folding mechanism comprising a pair of conveyor means disposed in the same plane and spaced from each other to define a slot therebetween for conveying a continuous web of material, a cutting means disposed at the entrance of said conveyor means for cutting the continuous web of material into individually cut lengths and a folding and holding assembly disposed on each side of said slot in a plane of 90° to the plane of said conveyor means to fold and hold the individually cut lengths of material, said folding and holding assembly comprising a pair of superposed holding plates disposed on one side of said slot for receiving and holding the folded and cut pieces, one of said holding plates being mounted stationary and the other of said holding plates being mounted movable so as to be adapted to assume a position slightly spaced from said stationary holding plate to allow the folded cut pillow case to be placed therebetween and adapted to assume a position in contact with said stationary holding plate to clamp said folded cut lengths therebetween and a movable pusher plate disposed on the other side of said slot and adapted to contact the cut unfolded piece transversely across its midpoint to push the cut lengths into a folded position between said holding plates.

4. A mechanism for folding individually cut pieces of a determinate length comprising a movable pusher plate and a pair of superposed holding plates for receiving and holding the folded cut pieces, one of said holding plates being mounted stationary and the other of said holding plates being mounted movable so as to assume a position slightly spaced from said stationary holding plate to allow said pusher to push the cut pieces therebetween and being adapted to assume a position in contact with said stationary holding plate to clamp said cut piece therebetween, said movable pusher plate adapted to contact the cut unfolded pieces transversely across their midpoint and to push the cut pieces into a folded position between said holding plates.

References Cited by the Examiner

UNITED STATES PATENTS

| 208,831 | 10/1878 | Lauder | 270—83 |
| 893,136 | 7/1908 | Brannen | 270—83 |
| 2,145,592 | 1/1939 | Folger | 270—83 |
| 2,667,132 | 1/1954 | Golden. | |
| 2,694,372 | 11/1954 | Hadfield. | |
| 2,940,404 | 6/1960 | Damon | 112—10 |
| 2,983,236 | 5/1961 | Thompson | 112—2 |
| 3,126,848 | 3/1964 | Gastonguay | 112—10 |

FOREIGN PATENTS

| 238,770 | 1/1960. | Australia. |

JORDAN FRANKLIN, *Primary Examiner.*

A. R. GUEST, *Assistant Examiner.*